(12) United States Patent
Cho et al.

(10) Patent No.: US 9,894,503 B2
(45) Date of Patent: Feb. 13, 2018

(54) METHOD AND APPARATUS FOR MANAGING CALL INFORMATION

(71) Applicant: LG CNS CO., LTD., Seoul (KR)

(72) Inventors: Chun Rae Cho, Seoul (KR); Jeong Pyo Kim, Seoul (KR); Sung Yong Park, Seoul (KR); Soon Gi Yoon, Seoul (KR); Kwan Pyo Lee, Seoul (KR); Moon Ho Ha, Seoul (KR); Sung Ho Kim, Seoul (KR)

(73) Assignee: LG CNS CO., LTD., Seoul (KR)

( * ) Notice: Subject to any disclaimer, the term of this patent is extended or adjusted under 35 U.S.C. 154(b) by 338 days.

(21) Appl. No.: 14/558,387

(22) Filed: Dec. 2, 2014

(65) Prior Publication Data

US 2016/0157072 A1 Jun. 2, 2016

(51) Int. Cl.
*H04W 4/22* (2009.01)

(52) U.S. Cl.
CPC .................................... *H04W 4/22* (2013.01)

(58) Field of Classification Search
CPC ........ H04W 4/11; H04W 76/007; H04W 4/22
See application file for complete search history.

(56) References Cited

U.S. PATENT DOCUMENTS

| | | | | |
|---|---|---|---|---|
| 2007/0123287 A1* | 5/2007 | Mock | ................. | H04L 41/0686 455/518 |
| 2013/0223606 A1* | 8/2013 | Lee | ........................ | H04M 3/46 379/207.08 |
| 2014/0065997 A1* | 3/2014 | Walker | .................... | H04W 4/02 455/404.1 |
| 2014/0257897 A1* | 9/2014 | Fernandez, Jr. | ................. | G06Q 10/063114 705/7.15 |

\* cited by examiner

*Primary Examiner* — Daniel Lai
*Assistant Examiner* — Frank Donado
(74) *Attorney, Agent, or Firm* — Lee, Hong, Degerman, Kang & Waimey

(57) ABSTRACT

A method and apparatus for managing call information is provided. The method includes: receiving reception notification data from a server that indicates call information is received, receiving the call information from the server according to the reception notification data in response to an input of a manager and displaying the call information and an initial process state of the call information on a screen of the display.

16 Claims, 9 Drawing Sheets

FIG. 1
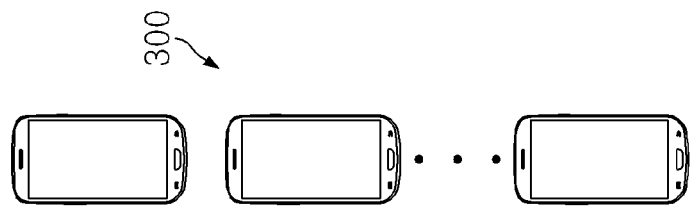
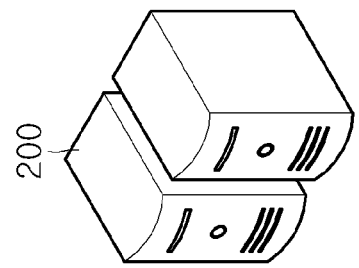
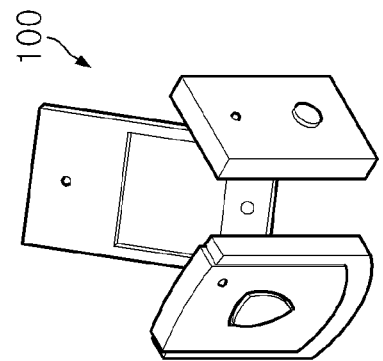

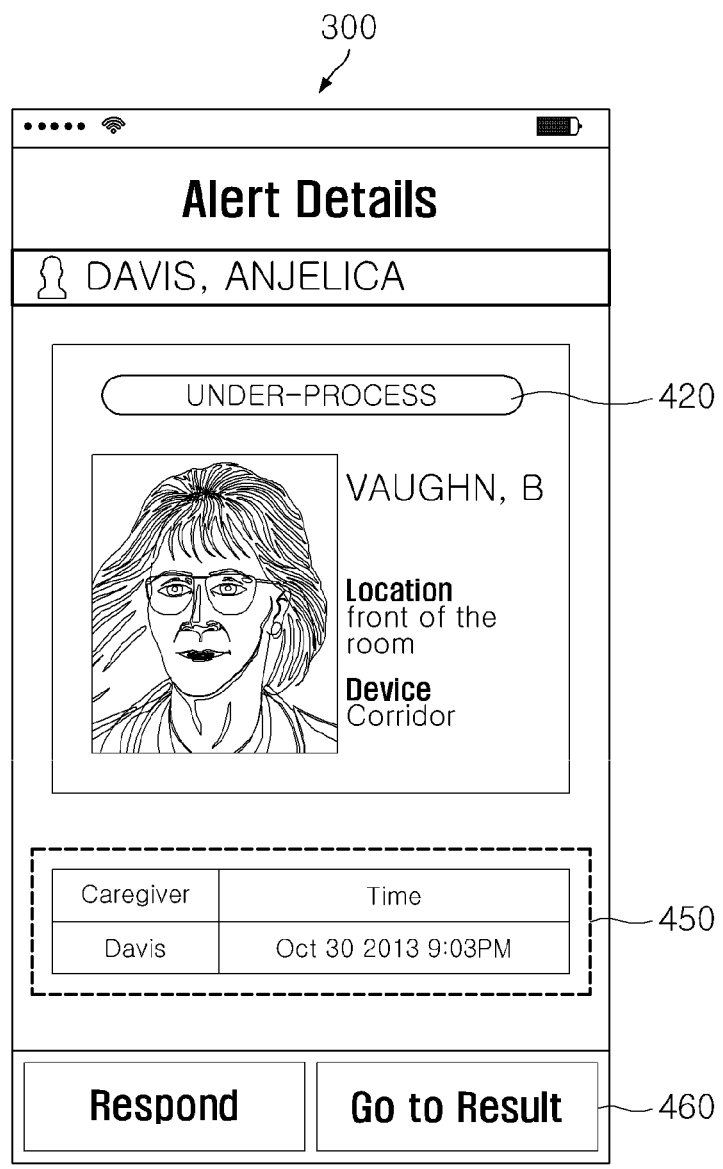

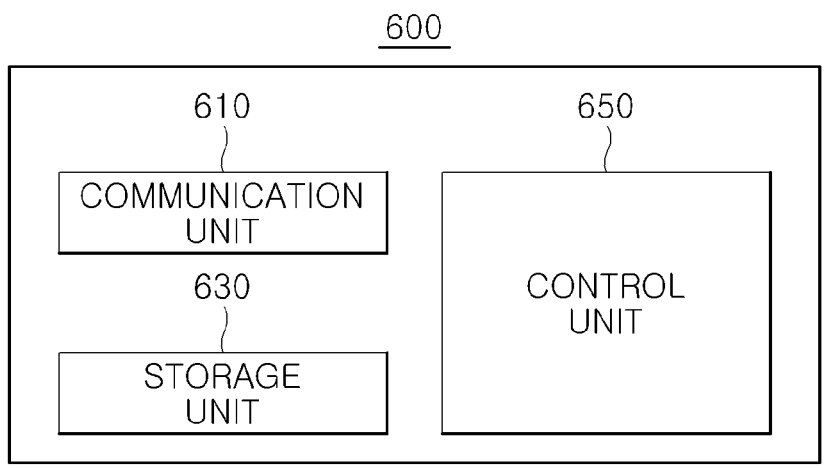
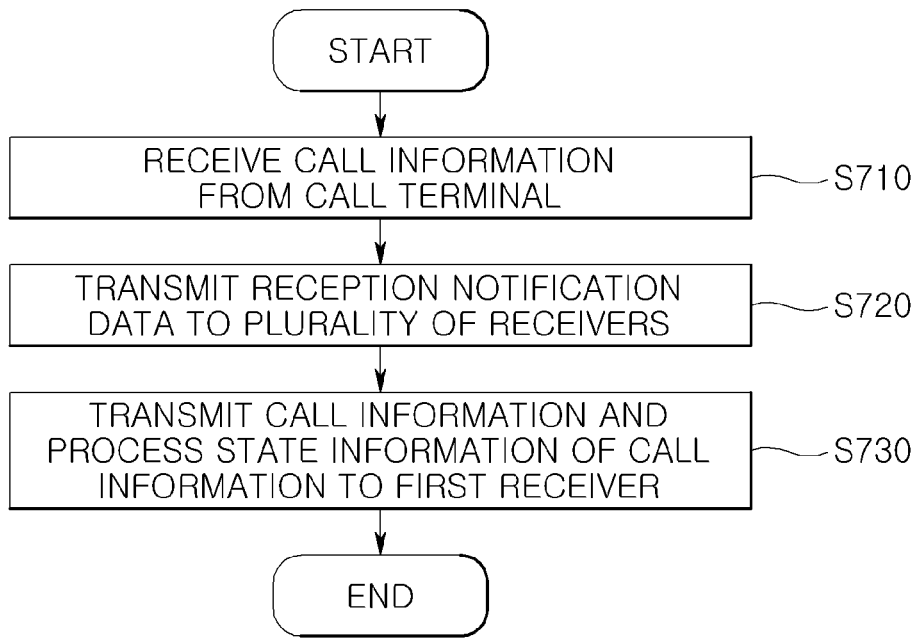

METHOD AND APPARATUS FOR MANAGING CALL INFORMATION

FIELD OF THE INVENTION

The present invention relates to a method and apparatus for managing call information, and more particularly, to a server, a receiver apparatus, and a method for managing call information generated by a managed person.

DESCRIPTION OF THE RELATED ART

When a managed person is in an emergency situation in any one of various places, such as in a hospital, a call system is used to notify the emergency situation to a manager. Generally, the call system includes a call terminal owned by the managed person or installed in a specific place and a receiver used by the manager.

If an emergency situation exists and the managed person selects a button of the call terminal, call information is transmitted to the receiver. Upon receiving the call information, the manager recognizes that an emergency situation exists with regard to the managed person and may take appropriate action. Such a call system is necessary in a hospital or a sanatorium since the emergency situation may be directly related to the managed person's life.

According to a general call system, call information is only transmitted to a receiver when a managed person manipulates a call terminal. Therefore, the general call system is insufficient for use in a hospital or other place where various emergency situations may occur.

For example, if call information is transmitted to receivers of various managers, it is difficult to determine which manager recognized the call information, which manager is dealing with an emergency in response to the call information, or even whether the emergency is being handled. Additionally, since a receiver of the general call system performs only a function of receiving call information, a manager must carry several devices including the receiver.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one aspect of the present invention, a method for a receiver managing call information is provided. The method includes receiving reception notification data from a server that indicates call information is received, receiving the call information from the server according to the reception notification data in response to an input of a manager and displaying the call information and a process state of the call information on a screen of a display.

It is contemplated that the method further includes changing the displayed process state to a second process state in response to a selection of the manager on a first menu displayed on the screen if the process state is an initial process state. It is contemplated that the method further includes transmitting state change request data to the server to request that the server transmit the call information in the second process state to other receivers.

It is contemplated that the method further includes receiving a selection input of a manager on a second menu displayed on the screen after the process state is changed to the second process state and transmitting help request call information to the server for transmission by the server to other receivers. It is contemplated that the method further includes changing the displayed process state to a third process state based on a selection of a manager on a second menu displayed on the screen after the process state is changed to the second process state.

It is contemplated that changing the process state from the second process state to the third process state includes receiving a process result of the call information from the manager and transmitting process result data of the call information to the server. It is contemplated that the method further includes displaying a plurality of call information pre-received by the server and a process state of each of the plurality of call information pre-received by the server based on an input of a manager.

In another aspect of the present invention a method for a server managing call information is provided. The method includes receiving call information from a call terminal of a managed person, transmitting reception notification data to a plurality of receivers that indicates call information is received and transmitting the call information and related process state information to a first receiver of the plurality of receivers in response to a request from the first receiver.

It is contemplated that the method further includes changing a process state of the call information from a first state to a second state when first state change request data is received from the first receiver. It is contemplated that the method further includes transmitting the call information in the second state and process state information related to the call information to a second receiver of the plurality of receivers in response to a request of the second receiver.

It is contemplated that transmitting the call information and process state information to the second receiver includes transmitting identification information to the second receiver of a manager using the first receiver. It is contemplated that the method further includes changing the process state of the call information from the second state to a third state when second state change request data is received from the first receiver.

It is contemplated that changing the process state of the call information from the second state the third state includes storing process result data related to the received call information. It is contemplated that the method further includes receiving help request call information from the first receiver after the process state is changed to the second state and transmitting reception notification data to the plurality of receivers to indicate that the help request call information is received.

It is contemplated that the method further includes receiving a call information inquiry request from one receiver of the plurality of receivers and transmitting a plurality of pre-received call information and process state information related to each of the plurality of call information to the one receiver. It is contemplated that the method further includes receiving data from each of the plurality of receivers indicating that the call information cannot be processed and re-transmitting the reception notification data to each of the plurality of receivers.

In another aspect of the present invention, a computer-readable recording medium is provided. The computer-readable medium has recorded thereon a program for executing a method for a receiver managing call information.

In another aspect of the present invention, a computer-readable recording medium is provided. The computer-readable medium has recorded thereon a program for executing a method for a server managing call information.

In another aspect of the present invention, a receiver for managing call information is provided. The receiver includes a communication unit configured to transmit and receive information, a display configured to display information and a processor configured to control the communication unit to receive reception notification data that indicates call information of a managed person is received, control the communication unit to receive the call information from the server according to the reception notification data in response to an input of a manager and control the display to display the call information and an initial process state of the call information.

In another aspect of the present invention, a server for managing call information is provided. The server includes a communication unit configured to transmit and receive information and a processor configured to control the communication unit to receive call information from a call terminal of a managed person, control the communication unit to transmit reception notification data to a plurality of receivers that indicates the call information is received and control the communication unit to transmit the call information and related process state information to a first receiver of the plurality of receivers in response to a request of the first receiver.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The objects, features and advantages of the present invention will be more clearly understood from the following detailed description taken in conjunction with the accompanying drawings, in which:

FIG. 1 illustrates a call system according to an embodiment of the present invention;

FIGS. 4A through 4D illustrate call information displayed on a screen of a receiver according to embodiments of the present invention;

FIG. 6 illustrates a block diagram of a receiver according to an embodiment of the present invention; and FIG. 7 illustrates a method of managing call information, according to an embodiment of the present invention.

DESCRIPTION OF THE PREFERRED EMBODIMENTS

Figure 2:
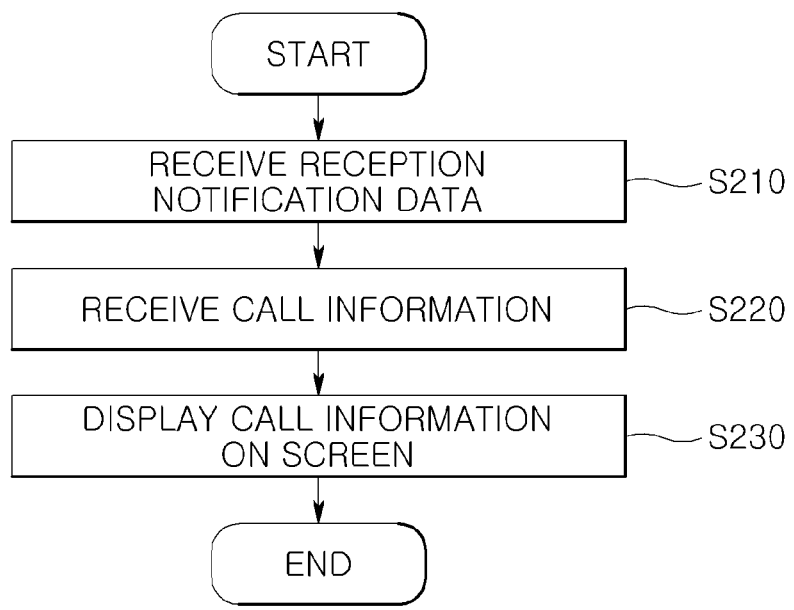
FIG. 2 illustrates a method for managing call information, according to an embodiment of the present invention.

Exemplary embodiments of the present invention will be described in detail with reference to the accompanying drawings. While the present invention will be described in conjunction with exemplary embodiments, it is to be understood that the description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims. In the drawings, like reference numerals denote like elements.

According to exemplary embodiments of the present invention, the word "unit" may refer to a software component or hardware component such as an FPGA or ASIC capable of performing a function or operation. However, "unit" is not limited to hardware or software.

A "unit" may be configured to reside in an addressable storage medium or to drive one or more processors. A "unit" may refer to software components, object-oriented software components, class components, task components, processes, functions, attributes, procedures, subroutines, program code segments, drivers, firmware, microcode, circuits, data, databases, data structures, tables, arrays or variables. A function provided by a component and "unit" may be a combination of smaller components and "units" and may be combined with others to compose large components and "units" or further divided into "units" along with other components.

A "managed person" is a person to be managed, such as a patient in a hospital, an old person in a sanatorium, or a child in school. A ""manager" is a person, such as a medical care provider, care giver, or teacher, who manages a physical condition of a managed "person" or take action in an emergency situation related to the managed "person."

FIG. 1 illustrates a call system according to an embodiment of the present invention. Referring to FIG. 1, the call system may include a call terminal 100, a server 200, and a plurality of receivers 300.

The call terminal 100 is a terminal that is owned by a managed person or provided at a specific location. When an emergency situation occurs with regard to the managed person, the managed person may manipulate the call terminal to transmit call information to a manager.

The server 200 is an interface between the call terminal 100 and the receivers 300 by transmitting the call information from the call terminal to the receivers. The server may also update a process state of the call information or transmit help request call information to other receivers among the plurality of receivers based on data received from any one receiver among the plurality of receivers. An application for managing call information may be installed in the server.

Each receiver 300 is a terminal used by the manager to receive the call information from the server 200. Each receiver may be any type of mobile terminal that can be connected to the server via a predetermined network, such as a smart phone, a personal digital assistant (PDA), a laptop, or a tablet personal computer (PC). An application for managing call information may be installed in each receiver.

Each receiver 300 is a multi-purpose mobile terminal that not only performs functions of a device receiving call information, such as a smart phone or a PDA, but also performs other functions. Therefore, the manager may perform various operations, such as receiving call information and managing schedules, by using one receiver.

Although not shown in FIG. 1, the call system may further include a call receiving server that receives call information from the call terminal 100 and transmits the call information to the server 200 as well as a push server that transmits reception notification data to the receiver 300 to indicate that the call information is received via the server.

Generally, both the call terminal 100 that transmits the call information to the receiver 300 and the call receiving server that transfers the call information between the call terminal and the receiver operate according to a predetermined interface standard. In other words, the call receiving server only operates according to the predetermined interface standard used by the call terminal and the receiver.

The server 200 receives the call information according to HTTP RESTful from the call receiving server and may use JSON as a data transmission format. The server may be connected to a plurality of call receiving servers using different interface standards in order to manage call information received from each of the call receiving servers. In other words, the server may integrate several call systems using different interface standards.

Operations of the receiver 300 will be described in detail with reference to FIG. 2. FIG. 2 illustrates a method for managing call information according to an embodiment of the present invention.

In operation S210, the receiver 300 receives reception notification data from the server 200 indicating that call information is received. When a managed person transmits call information to the server 200 via the call terminal 100, the server may transmit the reception notification data to the receiver to indicate that the call information is received from the managed person. Upon receiving the reception notification data, the receiver may display the reception notification data on a screen in a pop-up form.

The call terminal 100 may pre-store identification (ID) information of the managed person. The call information may include the ID information of the managed person, such as a name and social security number. The call information may further include location information related to a location of the call terminal.

In operation S220, the receiver 300 receives the call information from the server 200 in response to an input of a manager and according to the reception notification data. When an input for viewing the call information is received from the manager, the receiver may request and receive call information from the server.

In operation S230, the receiver 300 displays the call information received from the server 200 on the screen. The manager may view the call information displayed on the screen and determine where and for which managed person an emergency situation exists. The server may transmit process state information related to the call information to the receiver together with the call information. The receiver may display the call information on the screen while displaying a process state of the call information on the screen.

The process state of the call information may be a first state, a second state, or a third state where the first state is a pre-process state of the call information, the second state is an under-process state of the call information, and the third state is a process-completed state of the call information. For example, when the screen of the receiver 300 displays the first state, the manager may determine that no action has been taken with regard to the managed person and directly deal with the emergency situation. Alternatively, when the screen of the receiver displays the third state, the manager may determine that the emergency has ended and conduct other businesses.

The first through third states of the call information are only examples. Various types of the process states may be set according to characteristics of a place where the call system is utilized or according to convenience of the manager.

According to the call system of an embodiment of the present invention, the manager may not only check the call information but also check the process state of the call information. Therefore, the manager may easily determine whether an emergency situation must be directly handled or whether businesses other than dealing with the emergency situation may be conducted.

Figure 3:
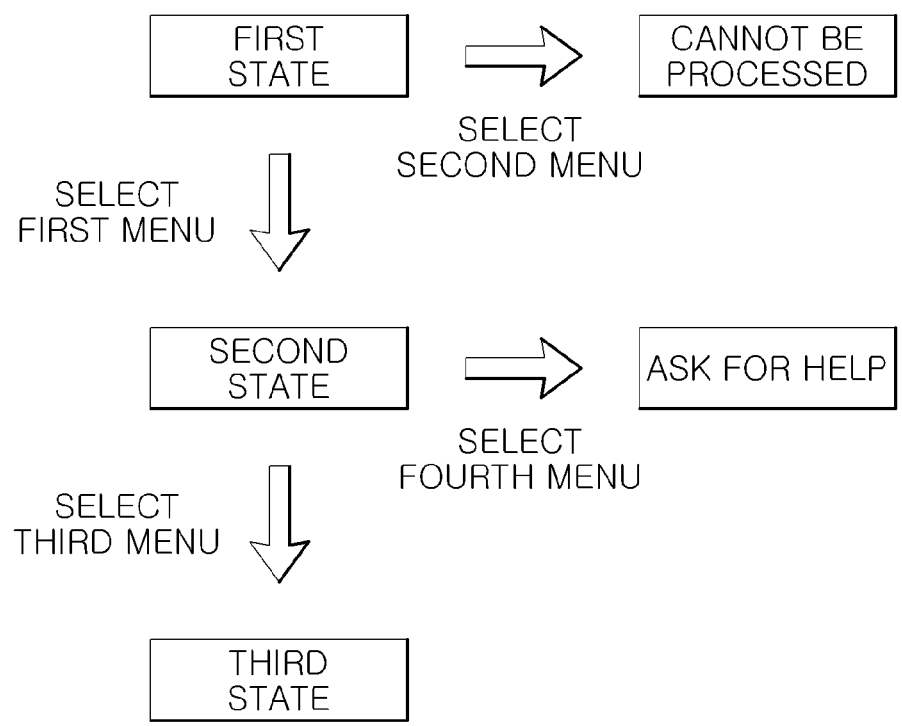
FIG. 3 illustrates a diagram for describing a change of a process state of call information according to a selection of a menu displayed on a screen of a receiver.

FIG. 3 illustrates a diagram for describing a change of the process state of the call information according to a selection of a menu displayed on the screen of the receiver 300 according to embodiments of the present invention. FIGS. 4A through 4D illustrate call information displayed on the screen of the receiver according to embodiments of the present invention.

Figure 4A:
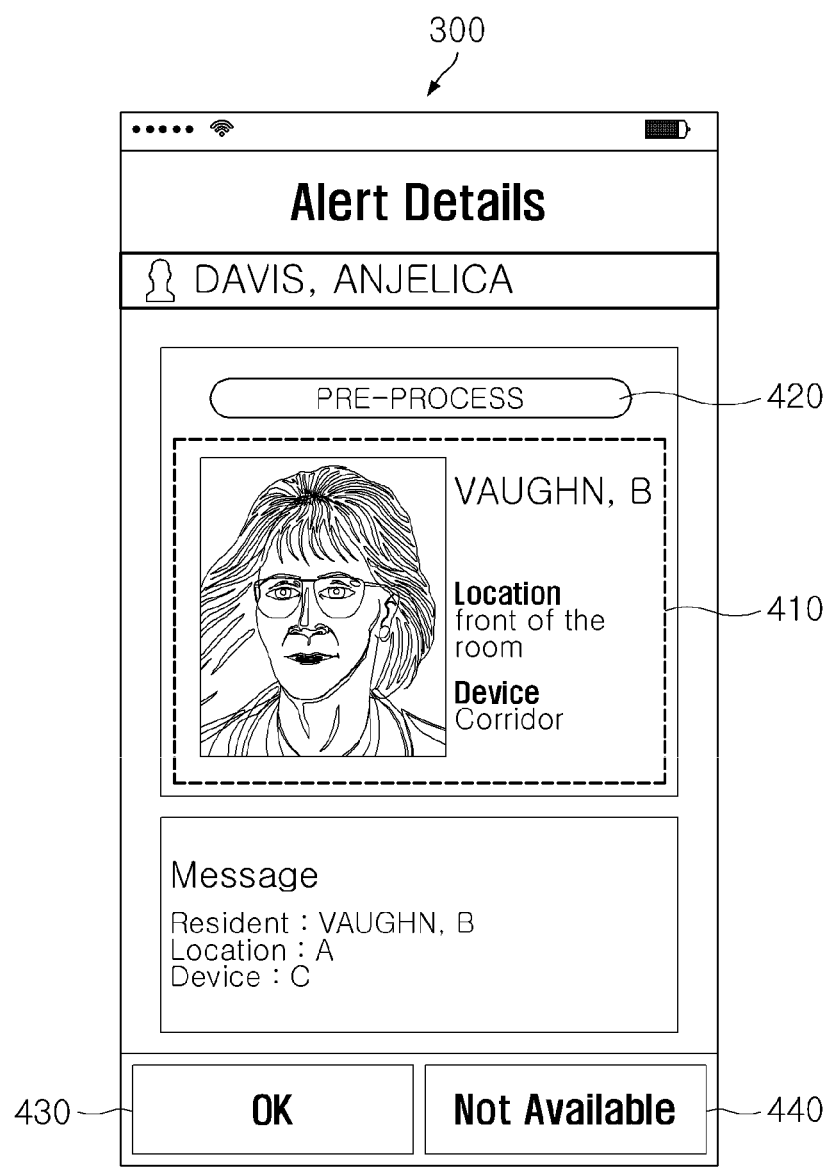

When the server 200 receives the call information in response to the managed person manipulating the call terminal 100, an initial process state of the call information is the first state since no action has yet been taken for the call information. As shown in FIG. 4A, the receiver 300 may display the call information received from the server on the screen.

Referring to FIG. 4A, a process state 420 of the call information is in a pre-process state. The screen may display ID information 410 of the managed person who manipulated the call terminal 100. A first menu 430 ("Response") and a second menu 440 ("Not Available") may be displayed on the screen of the receiver 300.

If the manager determines that he/she is unable to deal with the call information and selects the "Not Available" menu 440, the receiver 300 transmits data to the server 200 indicating that the call information cannot to be processed. Alternatively as shown in FIG. 4B, if the manager wants to deal with the call information and selects the "Response" menu 430, the receiver transmits state change request data to the server and changes the process state 420 from the pre-process state to an under-process state. When the server receives a request for the call information from another receiver, the server may transmit the call information in the under-process state to the other receiver in order to notify the other receiver that the call information is currently being processed.

Referring to FIG. 4B, when the call information is in the under-process state, the receiver 300 may display ID information 450 of the manager who checked the call information. If the manager wants to input a process result of the call information, the manager may select a "Go to Result" menu 460.

Figure 4C:
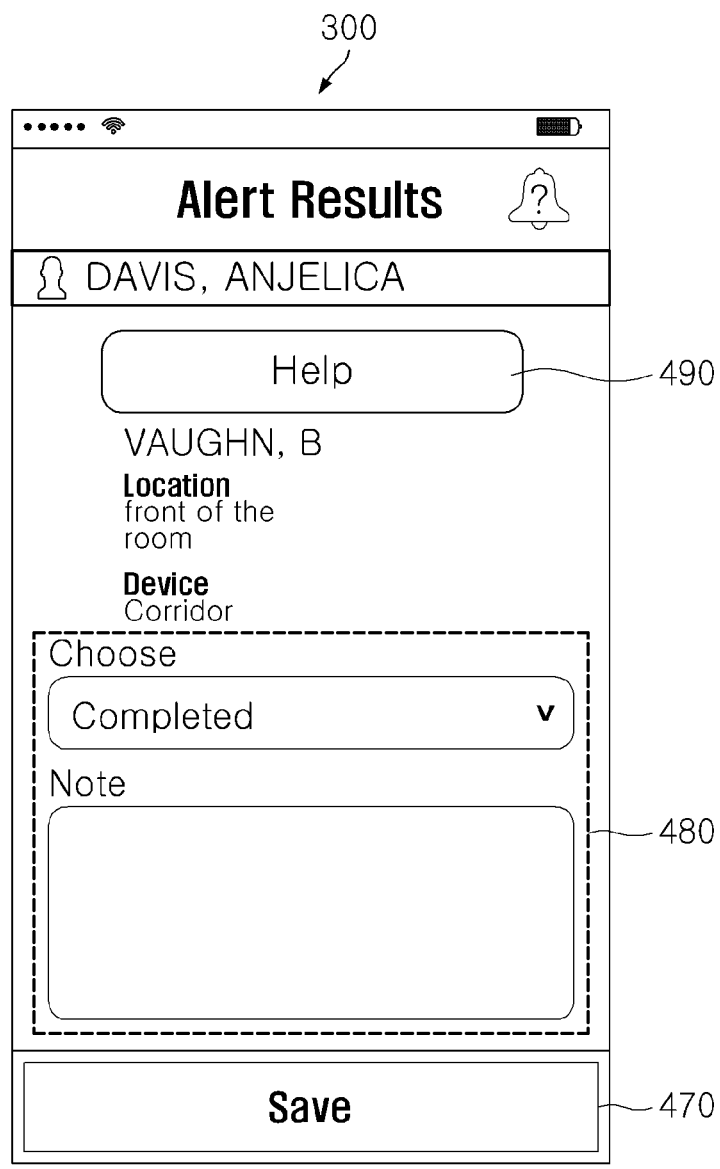

When the manager selects the "Go to Result" menu 460, the receiver 300 may display a third menu 470 ("Save") and a fourth menu 490 ("Help") on the screen as shown in FIG. 4C. The receiver may also display a region 480 for entering the process result of the call information on the screen.

If several managers are required to address the emergency situation of the managed person, one manager may select the "Help" menu 490. When the "Help" menu is selected, the receiver 300 may transmit help request call information to the server 200 and the server transmits the help request call information to the other receivers. Upon checking the help request call information, the other managers may address the emergency situation of the managed person together with the manager who transmitted the help request call information.

Figure 4D:
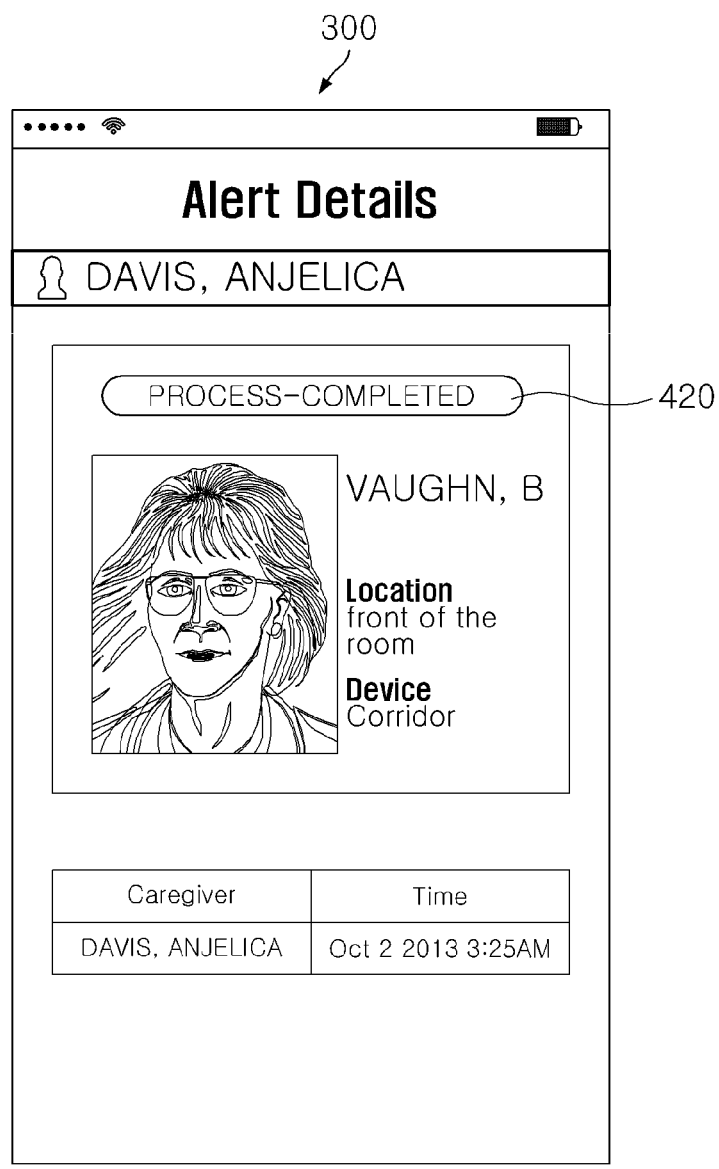

When the emergency situation of the managed person has been addressed, the manager may select the "Save" menu 470. Before selecting the "Save" menu, the manager may enter the process result of the call information to the region 480. When the "Save" menu is selected by the manager, the receiver 300 transmits state change data to the server 200 and changes the process state 420 of the call information from the under-process state to a process-completed state, as shown in FIG. 4D.

The server 200 may transmit the call information in to the other receivers 300 in the process-completed state. The receiver may also transmit the process result entered by the manager to the server.

Figure 5:
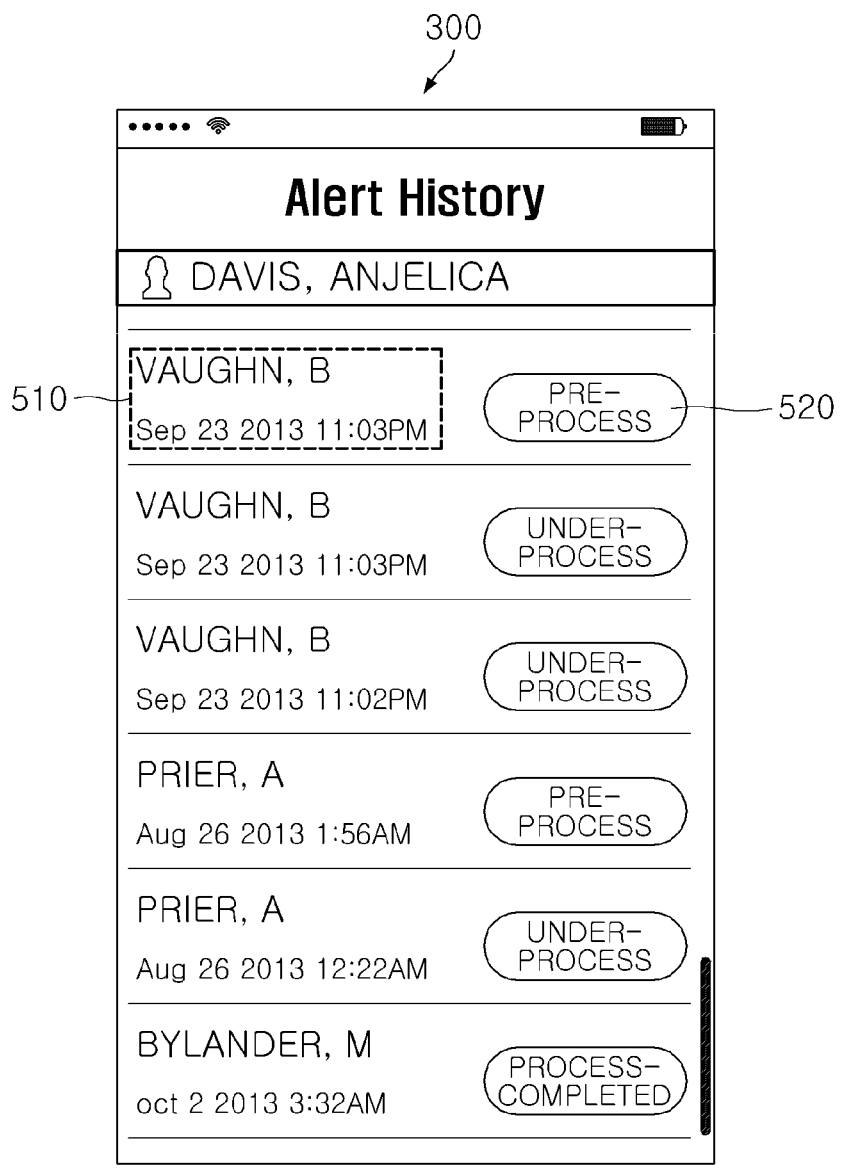
FIG. 5 illustrates process details of call information displayed on a screen of a receiver according to an embodiment of the present invention.

FIG. 5 illustrates call information displayed on the screen of the receiver 300 according to an embodiment of the present invention. The receiver may display a plurality of call information 510 that is pre-transmitted to the server 200 and a process state 520 of each of the plurality of call information 510. For example, the receiver may transmit a call information inquiry request to the server in response to an input of the manager and display the plurality of call information and the process state of each of the plurality of call information received from the server on the screen.

FIG. 6 illustrates a block diagram of a receiver 600 according to another embodiment of the present invention. The receiver 600 may include a communication unit 610, a storage unit 630, and a control unit 650.

The communication unit 610 transmits and receives data to and from the server 200 via a predetermined network. The storage unit 630 may include a memory and a program for managing call information may be stored in the storage unit. The control unit 650 may include a processor and may manage call information under control of the program stored in the storage unit.

In FIG. 6, the communication unit 610 and the control unit 650 are shown as individual modules. However, the communication unit and control unit but may be configured as a single module.

When reception notification data is received indicating that call information is received from the server 200, the communication unit 610 requests and receives the call information from the server under control of the control unit 650 in response to an input of the manager. The communication unit may also receive process state information related to the call information from the server.

The control unit 650 receives from the server 200 and displays the call information and a process state related to the call information on a screen. When the process state of the call information is a first state, the control unit transmits state change request data to the server via the communication unit 610 in response to the manager's selection on a first menu displayed on the screen and changes the process state of the call information to a second state. Alternatively, when the process state of the call information is the first state, the control unit may transmit data to the server via the communication unit to indicate that the call information cannot be processed in response to the manager's selection on a second menu displayed on the screen.

After the process state of the call information is changed to the second state, the control unit 650 transmits state change request data to the server 200 via the communication unit 610 in response to the manager's selection on a third menu displayed on the screen and changes the process state of the call information to a third state. The control unit may receive a process result related to the call information from the manager and transmit the process result to the server via the communication unit.

Alternatively, when a fourth menu displayed on the screen is selected by the manager after the process state of the call information is changed to the second state, the control unit 650 may transmit help request call information to the server 200 via the communication unit 610 and the server 200 transmits the help request call information to the other receivers 600. The control unit may also transmit a call information inquiry request to the server in response to the manager's input and receive from the server and display a plurality of call information and a process result related to each of the plurality of call information on the screen.

Operations of the server 200 will be described in detail with reference to FIG. 7. FIG. 7 illustrates a method for managing call information according to another embodiment of the present invention.

In operation S710, the server 200 receives call information from the call terminal 100 of the managed person. Upon receiving the call information, the server may initially set a process state of the call information to a first state.

In operation S720, the server 200 transmits reception notification data to the plurality of receivers 300 to indicate that the call information is received from the call terminal 100. The server may transmit the reception notification data to the plurality of receivers via a push server connected to the server such that a loss of the reception notification data may be avoided and the reception notification data may be quickly transmitted to the receivers.

In operation S730, the server 200 transmits the call information and process state information related the call information to a first receiver of the plurality of receivers 300 in response to a request of the first receiver. Upon receiving first state change request data from the first receiver, the server changes the process state of the call information transmitted to the receiver from the first state to a second state. Upon receiving a request for the call information from a second receiver of the plurality of receivers, the server may transmit the call information in the second state to the second receiver. The server may also transmit ID information of a manager using the first receiver to the second receiver while transmitting the call information in the second state to the second receiver.

If the server 200 receives data that the call information cannot be processed from all of the plurality of receivers 300 as well as from the first receiver, no action is taken for an emergency situation of the managed person. The server may re-transmit the reception notification data to the plurality of receivers.

When second state change request data is received from the first receiver after the process state of the call information is changed to the second state, the server 200 changes the process state of the call information to a third state. The server may also store process result data received together with the second state change request data. When a request for the call information is received from the second receiver, the server may transmit the call information in the third state to the second receiver.

If help request call information is received from the first receiver 300 after the process state of the call information is changed to the second state, the server 200 may transmit the help request call information to the other receivers so that the managers of the other receivers may help the manager of the first receiver.

When a call information inquiry request is received from a specific receiver of the plurality of receivers 300, the server 200 may transmit a plurality of pre-received call information and a process state of each of the plurality of call information to the specific receiver such that a manager of the specific receiver may check the plurality of call information and the process state of each of the plurality of call information.

Although not illustrated, the server 200 may include a communication unit, a storage unit, and a control unit similar to the receiver 600 illustrated in FIG. 6.

The communication unit 610 transmits and receives data to and from the receiver 600 via a predetermined network. The storage unit 630 may include a memory and a program for managing call information may be stored in the storage unit. The control unit 650 may include a processor and manage call information under control of the program stored in the storage unit. The communication unit and the control unit may be configured as a single module. Since a method of managing call information for the server 200 has been described previously, details thereof are not provided here.

The apparatus and method for managing call information according to the present invention provides efficient management of an emergency situation of a managed person. The apparatus and method for managing call information according to the present invention may reduce a workload of a manager addressing an emergency situation. The apparatus and method for managing call information according to the present invention may facilitate integration of call systems complying with several interface standards.

The embodiments of the present invention may be performed by computer-executable programs embodied within a conventional digital computer for executing the programs using a computer-readable recording medium. The computer-readable recording medium may include storage media such as a magnetic storage medium (e.g., ROMs, floppy disks, hard disks, etc.), an optically readable medium (e.g., CD ROMs, DVDs, etc.), and a carrier wave (e.g., transmission via the internet).

Although preferred embodiments of the present invention have been described to illustrate the present invention, those skilled in the art will appreciate that various modifications, additions and substitutions are possible, without departing from the scope and spirit of the invention as disclosed in the accompanying claims. Therefore, the embodiments of the present invention are disclosed only for illustrative purposes and should not be construed as limiting the present invention.

What is claimed is:

1. A method for a receiver managing call information, the method performed by the receiver and comprising:
    receiving reception notification data from a server that indicates call information is received from a call terminal;
    receiving the call information and a process state of the call information from the server when a request of a manager is received corresponding to the reception notification data;
    displaying the received call information and a process state, wherein the received call information includes identification information of a managed person who owns the call terminal and location information of the call terminal, the received process state indicates a pre-process state, an under-process state or a process-completed state, the process state is initially the pre-process state and the received call information indicates occurrence of an emergency situation related to the identified managed person;
    changing the displayed initial pre-process state to the under-process state based on a first input of the manager, and the first input of the manager indicates an availability to respond to the call during the emergency situation;
    changing the under-process state to the process-completed state based on a second input of the manager on a displayed menu after the displayed pre-process state is changed to the under-process state; and
    entering a process result of the call information regarding the displayed process-completed state by the manager.

2. The method of claim 1, further comprising:
    transmitting state change request data to the server to request changing the process state; and
    transmitting the changed process state to other receivers.

3. The method of claim 1, further comprising:
    receiving a selection input of the manager selection on a second displayed help menu after the process state is changed to the second under-process state; and
    transmitting help request call information to the server to request transmission of the help request call information to other receivers.

4. The method of claim 1, further comprising
    changing the second under-process state to the process-completed state based on a selection of the manager on a second displayed second menu after the displayed process state is changed to the under-second process state.

5. The method of claim 1, wherein changing the second under-process state to the third process-completed state comprises
    transmitting process result data of status data related to the call information to the server.

6. The method of claim 1, further comprising displaying a plurality of call information previously received by the server and a process state of each of the previously received plurality of call information based on an input of the manager.

7. A method for a server managing call information, the method comprising:
    receiving call information from a call terminal;
    transmitting reception notification data to a plurality of receivers that indicates the call information is received;
    transmitting the call information and a process state of the call information to a first receiver of the plurality of receivers in response to a request from the first receiver, the transmitted call information including identification information of a managed person who owns the call terminal and location information of the call terminal and the transmitted process state indicating a pre-process state, an under-process state or a process-completed state, wherein the transmitted process state is initially the pre-process state;
    changing the transmitted pre-process state to the under-process state in response to first state change request data received from the first receiver;
    changing the transmitted under-process state to the process-completed state when second state change request data is received from the first receiver after the transmitted pre-process state is changed to the under-process state; and
    transmitting the call information, the changed process state and a process result of the call information to a second receiver of the plurality of receivers,
    wherein the transmitted call information indicates occurrence of an emergency situation related to the identified managed person.

8. The method of claim 7, wherein transmitting the call information and related changed process state information comprises transmitting identification information of the user a manager using the first receiver to the second receiver.

9. The method of claim 7, wherein changing the process state to the third process-completed state comprises storing process result data related to the received call information.

10. The method of claim 7, further comprising: receiving help request information from the first receiver after the process state is
changed to the second under-process state; and
transmitting reception notification data to the plurality of receivers to indicate receipt of the help request information.

11. The method of claim 7, further comprising:
receiving a call information inquiry request from one of the plurality of receivers; and
transmitting a plurality of previously received call information and status information related to each of the plurality of call information to the one of the plurality of receivers.

12. The method of claim 7, further comprising:
receiving data from each of the plurality of receivers indicating that the call information cannot be processed; and
re-transmitting the reception notification data to the plurality of receivers.

13. A non-transitory computer-readable recording medium having recorded thereon a program for executing the method of claim 1.

14. A non-transitory computer-readable recording medium having recorded thereon a program for executing the method of claim 7.

15. A receiver for managing call information, the receiver comprising:
a communication unit configured to transmit and receive information;
a display configured to display information; and
a processor configured to:
control the communication unit to receive reception notification data from a server that indicates call information is received from a call terminal;
control the communication unit to receive the call information and a process state of the call information from the server when a request of a manager is received corresponding to the reception notification data;
control the display to display the received call information and process state, wherein the received call information includes identification information of a managed person who owns the call terminal and location information of the call terminal, the received process state indicates a pre-process state, an under-process state or a process-completed state, the process state is initially the pre-process state; and the received call information indicates occurrence of an emergency situation related to the identified managed person;
control the display to change the displayed initial pre-process state to the under-process state based on a first input of the manager, and the first input of the manager indicates an availability to respond to the call during the emergency situation;
control the display to change the under-process state to the process-completed state based on a second input of the manager on a displayed menu after the displayed pre-process state is changed to the under-process state; and
control the displayed menu to enter a process result of the call information regarding the displayed process-completed state by the manager.

16. A server for managing call information, the server comprising:
a communication unit configured to transmit and receive information; and a
processor configured to control the communication unit to:
receive call information from a call terminal;
transmit reception notification data to a plurality of receivers that indicates the call information is received;
transmit the call information and a process state of the call information to a first receiver of the plurality of receivers in response to a request from the first receiver, the transmitted call information including identification information of a managed person who owns the call terminal and location information of the call terminal, and the transmitted process state indicating a pre-process state, an under-process state or a process-completed state, wherein the transmitted process state is initially the pre-process state;
change the transmitted pre-process state to the under-process state in response to first state change request data received from the first receiver;
change the transmitted under-process state to the process-completed state when second state change request data is received from the first receiver after the transmitted pre-process state is changed to the under-process state; and
transmit the call information, the changed process state and a process result of the call information to a second receiver of the plurality of receivers, wherein the transmitted call information indicates occurrence of an emergency situation related to the identified managed person.

* * * * *